(12) United States Patent
Keller

(10) Patent No.: US 8,899,131 B2
(45) Date of Patent: Dec. 2, 2014

(54) DRIVELINE PRODUCT FOR SELECTIVE COUPLING OF MULTIPLE INPUTS AND MULTIPLE OUTPUTS

(75) Inventor: Robert Francis Keller, Chesterfield, MI (US)

(73) Assignee: BorgWarner Inc., Auburn Hills, MI (US)

( * ) Notice: Subject to any disclaimer, the term of this patent is extended or adjusted under 35 U.S.C. 154(b) by 202 days.

(21) Appl. No.: 13/490,077

(22) Filed: Jun. 6, 2012

(65) Prior Publication Data

US 2013/0036862 A1 Feb. 14, 2013

Related U.S. Application Data

(60) Provisional application No. 61/522,003, filed on Aug. 10, 2011.

(51) Int. Cl.
| | | |
|---|---|---|
| F16H 37/06 | (2006.01) |
| B60K 17/354 | (2006.01) |
| B60K 6/442 | (2007.10) |
| B60K 6/52 | (2007.10) |
| B60K 23/08 | (2006.01) |

(52) U.S. Cl.
CPC .............. *B60K 6/442* (2013.01); *B60K 17/354* (2013.01); *B60K 6/52* (2013.01); *Y02T 10/6234* (2013.01); *B60K 23/0808* (2013.01); *Y02T 10/6265* (2013.01)
USPC ......................................... 74/665 N; 74/661

(58) Field of Classification Search
USPC ................... 74/661, 665 L, 665 N
See application file for complete search history.

(56) References Cited

U.S. PATENT DOCUMENTS

| | | | |
|---|---|---|---|
| 5,386,898 A | 2/1995 | Weilant et al. | |
| 6,464,608 B2 * | 10/2002 | Bowen et al. | 475/5 |
| 6,490,945 B2 * | 12/2002 | Bowen | 74/339 |
| 6,631,779 B2 | 10/2003 | Watson et al. | |
| 6,679,799 B2 * | 1/2004 | Bowen | 475/5 |
| 6,780,134 B2 * | 8/2004 | Vonnegut et al. | 475/204 |
| 7,497,286 B2 | 3/2009 | Keller et al. | |
| 7,631,719 B2 * | 12/2009 | Wenthen | 180/243 |
| 2007/0034428 A1 | 2/2007 | Janson | |
| 2010/0262326 A1 | 10/2010 | Buszek et al. | |

FOREIGN PATENT DOCUMENTS

WO 2010141682 A1 12/2010

OTHER PUBLICATIONS eGearDrive Electric Drive Transmission ;Drivetrain Group : Torque Managment , product sheet ; copyright 2011 Borg Warner ;2 pages.
eGeardrive Electric Vehicle Transmission ; copyright 2002-2011 BorgWarner Inc. ; http://www.borgwarner.com/en/Drivetrain/products/Pages/eGeardrive.aspx ; 1 page.
Transfer Case ; copyright 2002-2011 BorgWarner Inc. ; http://www.borgwarner.com/en/Drivetrain/products/Pages/Transfer-Case.aspx ; 1 page.

* cited by examiner

*Primary Examiner* — Ha D Ho
(74) *Attorney, Agent, or Firm* — BrooksGroup

(57) ABSTRACT

A driveline product including first and second inputs having input rotational axes, first and second outputs having output rotational axes, a transfer coupling between at least one of the input rotational axes and at least one of the output rotational axes, and at least two selective couplings operatively coupled between the inputs and the outputs for operation selective between at least two drives powered by at least one of two prime movers.

27 Claims, 4 Drawing Sheets

US 8,899,131 B2

DRIVELINE PRODUCT FOR SELECTIVE COUPLING OF MULTIPLE INPUTS AND MULTIPLE OUTPUTS

This application claims the benefit of U.S. Provisional Application Ser. No. 61/522,003, filed Aug. 10, 2011.

TECHNICAL FIELD

The field to which the disclosure generally relates to: includes vehicle powertrains and, more particularly, driveline products of vehicle powertrains.

BACKGROUND

A conventional vehicle powertrain may include an engine, a transmission coupled to an output the engine to multiply torque produced by the engine, and a driveline coupled to an output of the transmission to transmit the multiplied torque from the transmission to wheels of the vehicle. The conventional driveline may include a driveshaft coupled to the transmission, and a rear axle coupled to the driveshaft and rear wheels of the vehicle. The conventional driveline also may include a power takeoff unit or a transfer case coupled to the transmission and the rear axle, and coupled to the transmission and a front axle coupled to front wheels of the vehicle.

SUMMARY OF SELECT EXAMPLES OF THE INVENTION

One embodiment of a driveline product includes a first input to receive first prime mover torque and having a first input rotational axis, a second input to receive second prime mover torque having a second input rotational axis, a first output to transmit first driveline torque and having a first output rotational axis, and a second output to transmit second driveline torque and having a second output rotational axis. The driveline product also includes a transfer coupling to couple at least one of the input rotational axes to at least one of the output rotational axes; a first selective coupling to couple the first input to the first output, a second selective coupling to couple the second input to the second output.

An embodiment of a vehicle powertrain includes an engine to produce engine torque and having an engine output, an electric motor to produce motor torque and having a motor output, a rear driveline having a rear driveline input, and a front driveline having a front driveline input. The vehicle powertrain also includes the driveline product as set forth above, and coupled to the drivelines and to the engine and the electric motor for operation selective between at least two of two-wheel drive, four-wheel drive, or regenerative drive, and selective of at least one of the engine or the electric motor.

Another embodiment of a driveline product includes first and second inputs having input rotational axes, first and second outputs having output rotational axes, a transfer coupling to couple at least one of the input rotational axes to at least one of the output rotational axes, and at least two selective couplings to couple the inputs and the outputs for operation selective between at least two drives powered by at least one of two prime movers.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Select examples of embodiments of the invention will become more fully understood from the detailed description and the accompanying drawings, wherein.

DETAILED DESCRIPTION OF SELECT EXAMPLES OF EMBODIMENTS

The following description of the embodiments) is merely illustrative in nature and is in no way intended to limit the invention, its application, or uses.

In general, the following description sets forth an example driveline product including first and second inputs having input rotational axes, first and second outputs having output rotational axes, a transfer coupling to couple at least one of the input rotational axes to at least one of the output rotational axes, and at least two selective couplings to couple at least one of the inputs to at least one of the outputs for operation selective between at least two drives powered by at least one of two prime movers.

Figure 1:
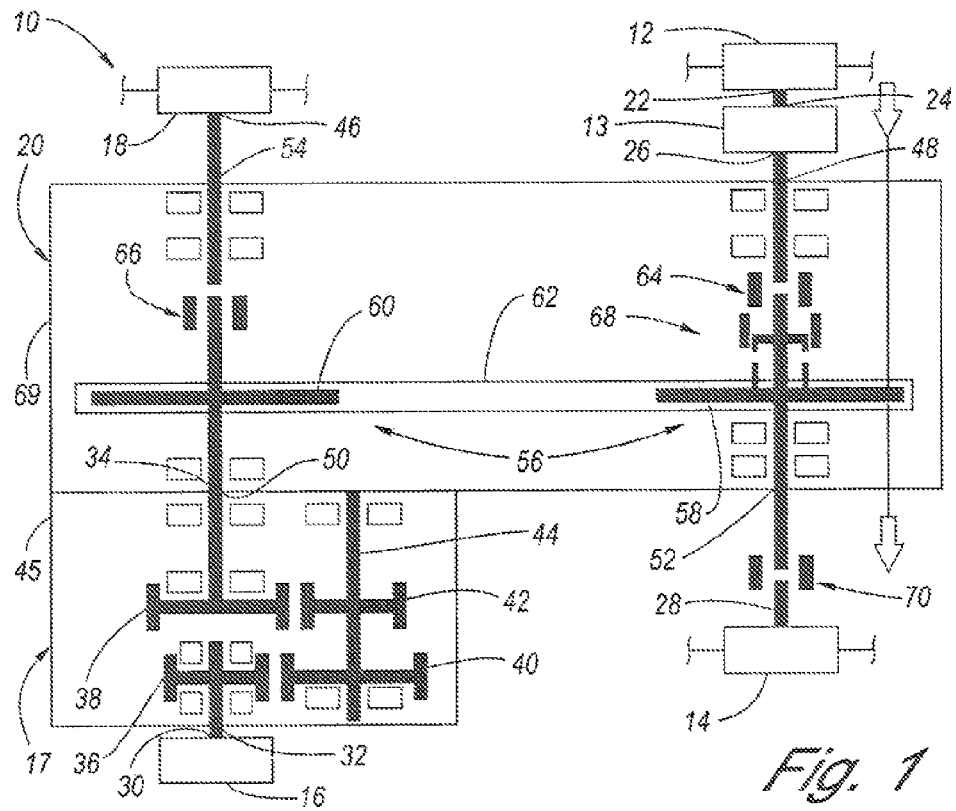
FIG. 1 illustrates a mechanical schematic of an embodiment of a portion of a vehicle powertrain according to a first mode of operation.

Referring now to the drawing figures, FIG. 1 illustrates an embodiment of a vehicle powertrain 10 that may include a first prime mover 12 and a first driveline 14, a second prime mover 16 and a second driveline 18, and a driveline product 20 coupled to the prime movers 12, 16, and to the drivelines 14, 18. As used herein, the phrase "prime mover" may include any machine that transforms energy in any form (e.g. chemical, thermal, electrical, pressure, or the like) to mechanical form. As used herein, the term "driveline" may include that portion of a powertrain that may be downstream of a transmission that may be coupled directly to a prime mover of the powertrain. Also, as used herein, the phrase "driveline product" may include a transfer case, power takeoff unit, gearbox, chainbox, or the like. The powertrain 10 also may include a first transmission 13 coupled to the first prime mover 12 and to the driveline product 20, and a second transmission 17 coupled to the second prime mover 16 and to the driveline product 20.

The first prime mover 12 may be used to produce prime mover torque and may include a first prime mover output 22. As used herein, the phrases "output" may include an output shaft, an output flange, an output hub, or any other suitable type of output component. For example, the first prime mover 12 may include an engine to produce engine torque and may have an engine output. The engine may include a heat engine, for example, an internal combustion engine that may operate on gasoline, diesel, or any other suitable type of fuel. In other embodiments, the first prime mover 12 may include any other suitable type of engine or any other suitable type of prime mover.

The first transmission 13 may be used to produce transmission torque and may include a first transmission input 24 coupled to the engine output 22 and a first transmission output 26 coupled to the driveline product 20. The transmission 13 may include any suitable device to multiply torque received from the first prime mover 12. For example, in one embodiment, the transmission 13 may include an electro-hydraulic multi-speed automatic transmission, a continuously variable automatic transmission, a manual transmission; a dual-clutch transmission, or any other suitable type of shiftable or variable ratio vehicle transmission. In another embodiment, the transmission 13 may include a shiftless or fixed ratio gearset or gearbox.

The first driveline 14 may be used to transmit torque to a first wheel set (not shown), and may include a first driveline input 28. The first driveline 14 may include a rear driveline. As used herein, the phrase "rear driveline" may include a driveshaft, an axle, axle shafts, hubs, couplings, and any other suitable driveline components. As also used herein, the term "input" may include an input shaft, an input flange, an input hub, or any other suitable type of input component.

The second prime mover 16 may be used to produce prime mover torque and may include a second prime mover output 30. For example, the second prime mover 16 may include an electric motor to produce electric motor torque and may have a motor output. In one embodiment, the electric motor may include a direct current or alternating current type of motor. In other embodiments, the second prime mover 16 may include any other suitable type of motor or any other suitable type of prime mover.

The second transmission 17 may be used to produce transmission torque and may include a second transmission input 32 coupled to the second prime mover output 30 and a second transmission output 34 coupled to the driveline product 20. The transmission 17 may include any suitable device to multiply torque received from the second prime mover 16. For example, in one embodiment, the transmission 17 may include an electro-hydraulic multi-speed automatic transmission, a continuously variable automatic transmission, a manual transmission, a dual-clutch transmission, or any other suitable type of shiftable or variable ratio vehicle transmission. In another embodiment, as illustrated in the drawing figures, the transmission 17 may include a shiftless gearset or gearbox. In this embodiment, the transmission 17 may include an input gear 36 that may be fixedly coupled to the input 32, an output gear 38 that may be fixedly coupled to the output 34, and first and second intermediate gears 40, 42 that may be fixedly coupled to a layshaft 44 having a rotational axis offset from a rotational axis of one or both of the input 32 or output 34. Of course, the second transmission 17 may include a housing 45 to carry and support the various transmission components in any suitable manner, and also may include bearings, shaft, washers, bushings, and the like. As used herein, the terminology "fixedly coupled to" includes something coupled to something else to rotate therewith without selective coupling therebetween.

The second driveline 18 may be used to transmit torque to a second wheel set (not shown), and may include a second driveline input 46. The second driveline 18 may include a front driveline. As used herein, the phrase "front driveline" may include a driveshaft, an axle, axle shafts, hubs, couplings, and any other suitable driveline components.

The driveline product 20 may be coupled to the drivelines 14, 18 and to the prime movers 12, 16 for operation selective between at least two drives. For example, the driveline product 20 may include two or more selective couplings to couple various inputs and outputs for operation selective between two-wheel drive, four-wheel drive, and/or regenerative drive. The driveline product 20 also may be powered by and selective of the first prime mover and/or the second prime mover.

The driveline product 20 may include inputs. For example, the driveline product 20 may include a first input 48 that may be coupled to the first prime mover output 22 via the transmission 13 to receive first prime mover torque, and the first input 48 also may have a first input rotational axis. In another example, the driveline product 20 may include a second input 50 that may be coupled to the second prime mover 16 via the transmission 17 to receive prime mover torque, and the second input 40 also may have a second input rotational axis laterally spaced apart from the first input rotational axis.

The driveline product 20 may include outputs. For example, the driveline product 20 may include a first output 52 that may be coupled to the first driveline input 28 as further described herein below to transmit first driveline torque to the first driveline, and the first output 52 may have a first output rotational axis. The first output 52 may be selectively coupled to the first driveline 14 in any suitable manner. In another example, the driveline product 20 may include a second output 54 that may be coupled to the second driveline input 46 to transmit second driveline torque to the second driveline 18, and the second output 54 may have a second output rotational axis laterally spaced apart from the first output rotational axis. The second output 54 may be fixedly coupled to the second driveline input 46 in any suitable manner.

In one embodiment, as illustrated in the drawing figures, the first output 52 may be coaxial with the first input 48, and the second output 54 may be coaxial with the second input 50. In other embodiments, one or both of the inputs 48, 50 may not be coaxial with their respective outputs 52, 54.

The driveline product 20 may include a transfer coupling 56 that may be coupled to the first output 52 and to the second input 50. The transfer coupling 56 may be a cross-axis type of transfer coupling and may be fixedly coupled to the second input 50 and selectively coupled to the first output 52. In one embodiment, the transfer coupling 56 may include a first sprocket 58 selectively coupled to the first output 52 as will be described herein below, and a second sprocket 60 splined or otherwise fixedly coupled to the second input 50, and an endless torque transmitting element 62 coupled to the first and second sprockets 58, 60. The endless torque transmitting element 62 may include a chain, belt, cable, or the like. In other embodiments; the transfer coupling 56 may include input and output gears (not shown) instead of the sprockets 58, 60, and also may include one or more idler gears (not shown) between the input and output gears instead of the chain or belt.

The driveline product 20 also may include several selective couplings. In a first example, a first selective coupling 64 may be coupled to the first input 48 and the first output 52. In a second example, a second selective coupling 66 may be coupled to the second input 50 and the second output 54. In a third example, a third selective coupling 68 may be coupled to the first output 52 and the transfer coupling 56. More specifically, the third selective coupling 68 may be coupled to the first output 52 and the first sprocket 58 of the transfer coupling 56. In a fourth example, a fourth selective coupling 70 may be coupled to the first output 52 and the first driveline 14. Although not shown, the fourth coupling 70 may be carried and/or supported by the housing 69. Of course, the driveline product 20 may include a housing 69 to carry and support the various driveline product components in any suitable manner, and also may include bearings, shafts, washers, bushings, and the like.

The selective couplings 64, 66, 68, 70 may include any suitable devices. For example, in one embodiment, one or more of the selective couplings 64, 66, 68, 70 may include a clutch, for example, a multiple plate wet clutch. In another embodiment, one or more of the selective couplings 64, 66, 68, 70 may include a synchronizer, for example, a manual transmission type of synchronizer. In a further embodiment, one or more of the selective couplings 64, 66, 68, 70 may include a disconnect, for example, a spline-to-spline axial disconnect device. In other embodiments, one or more of the selective couplings 64, 66, 68, 70 may include a dog clutch, a dry plate clutch, a cone clutch, or any other suitable type of automotive coupling.

The driveline product 20 may include a plurality of operational modes. In one embodiment, the driveline product 20 may include six modes of operation. In another embodiment, the driveline product 20 may include an additional, seventh, mode of operation.

In other embodiments, the powertrain 10 and/or driveline product 20 may be of different types; may have different constructions; may have more, less, and/or different components; and may have different arrangements. For example, the powertrain 10 need not include the fourth selective coupling 70 and the seventh mode.

With reference to FIG. 1, a first mode of operation may include the second and third selective couplings 66, 68 being disengaged and the first selective coupling 64 being engaged to transmit torque from the first input 48 to the first output 52. For example, the first mode may include a rear, two-wheel-drive (2WD), engine-only mode, where only the engine 12 drives rear wheels of a vehicle via the rear driveline 14 and the driveline product 20. In an embodiment including the fourth selective coupling 70, the first mode also may include the fourth selective coupling 70 being engaged. As used herein, the term "engaged" with reference to selective couplings includes providing a connection between two different components.

Figure 2:
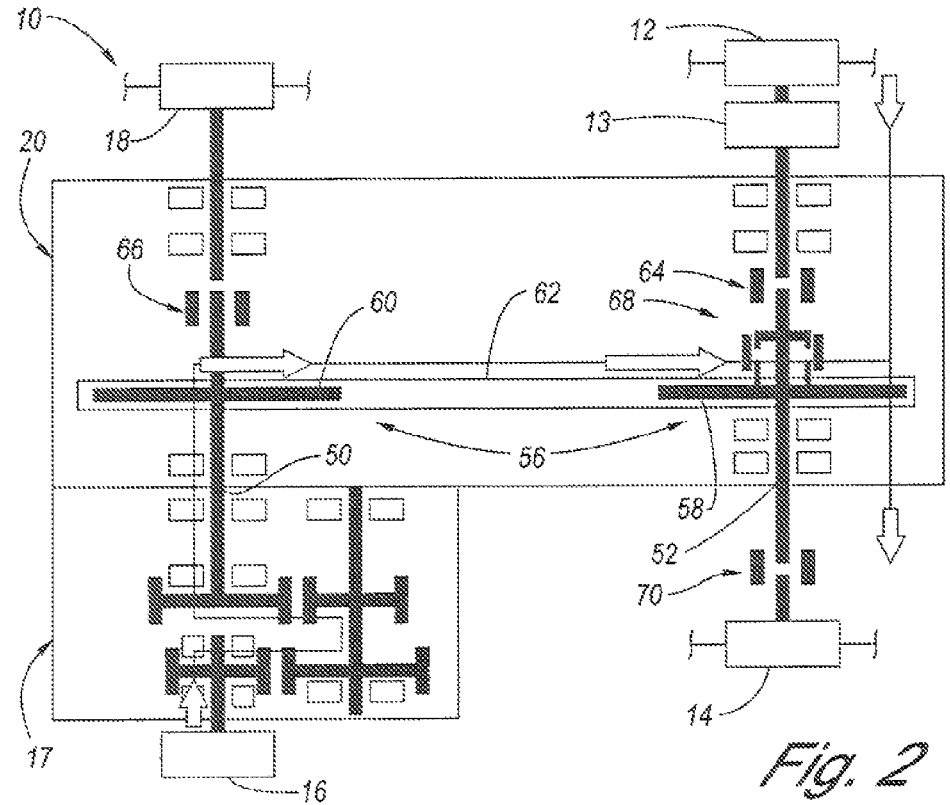
FIG. 2 illustrates a mechanical schematic of an embodiment of a portion of the vehicle powertrain of FIG. 1 according to a second mode of operation.

With reference to FIG. 2, a second mode of operation may include the second selective coupling 66 being disengaged and the first and third selective couplings 64, 68 being engaged to transmit torque from the first and second inputs 48, 50 to the first output 52. For example, the second mode may include a rear, 2WD, engine-and-motor mode, where both the engine 12 and the motor 16 drive the rear wheels of the vehicle via the rear driveline 14 and the driveline product 20. In an embodiment including the fourth selective coupling. 70, the second mode also may include the fourth selective coupling 70 being engaged.

Figure 3:
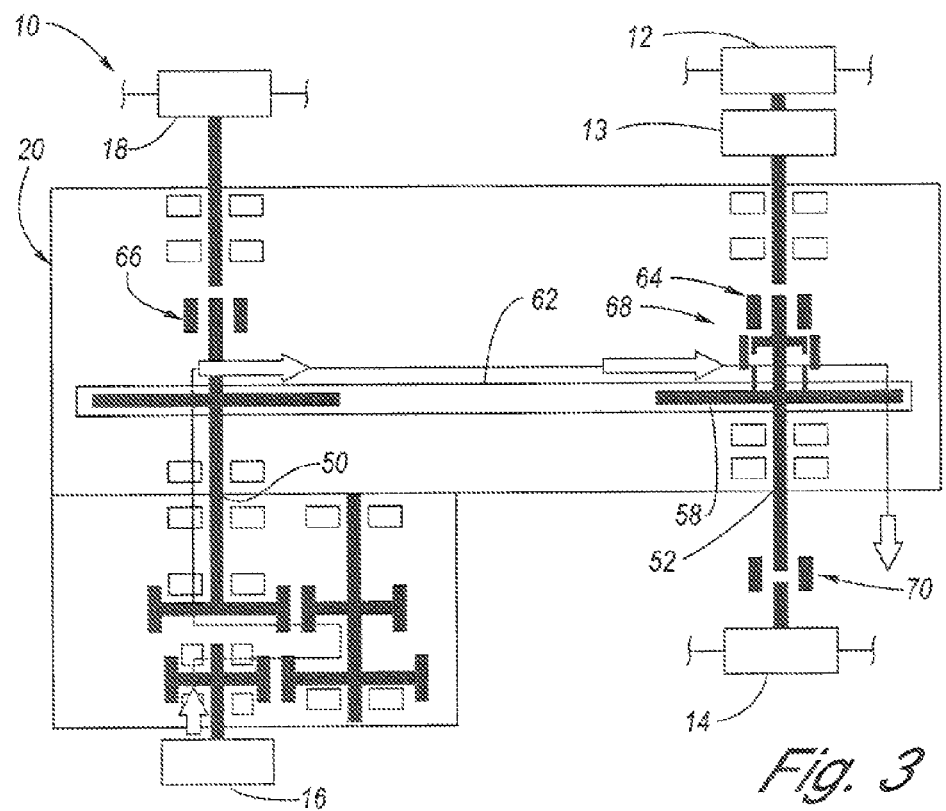
FIG. 3 illustrates a mechanical schematic of an embodiment of a portion of the vehicle powertrain of FIG. 1 according to a third mode of operation.

With reference to FIG. 3, a third mode of operation may include the first and second selective couplings 64, 66 being disengaged and the third selective coupling 68 being engaged to transmit torque from the second input 50 to the first output 52. For example, the third mode may include a rear, 2WD, motor-only mode, where only the motor 16 drives the rear wheels of the vehicle via the rear driveline 14 and the driveline product 20. In an embodiment including the fourth selective coupling 70, the third mode also may include the fourth selective coupling 70 being engaged.

Figure 4:
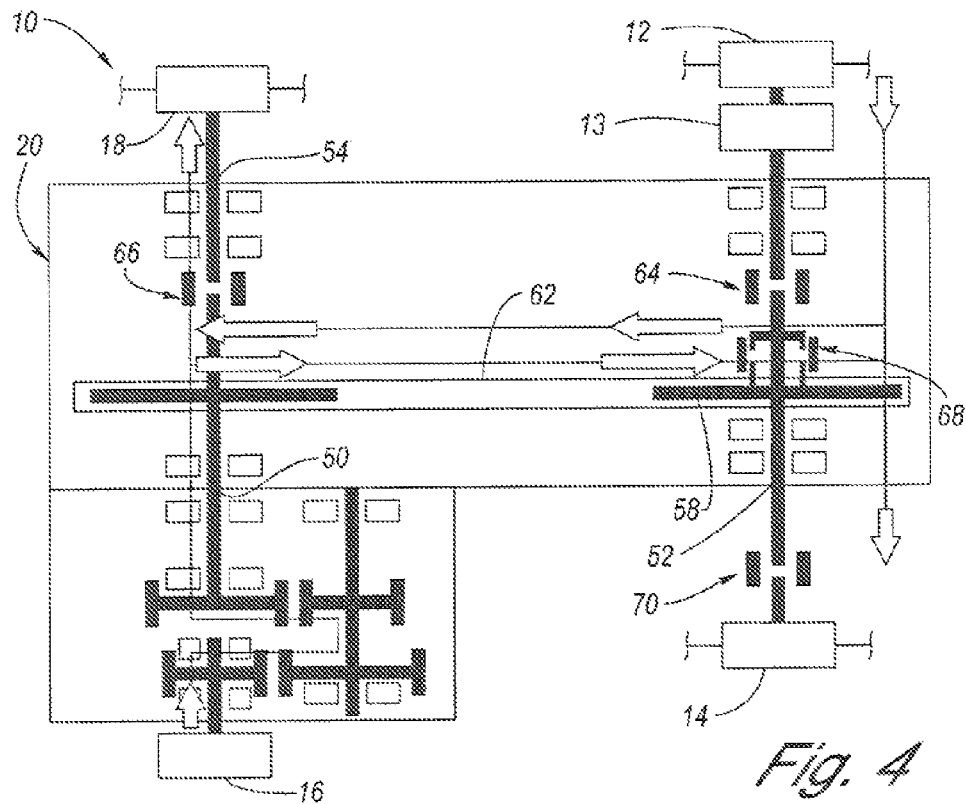
FIG. 4 illustrates a mechanical schematic of an embodiment of a portion of the vehicle powertrain of FIG. 1 according to a fourth mode of operation.

With reference to FIG. 4, a fourth mode of operation may include the first, second, and third selective couplings 64, 66, 68 being engaged to transmit torque from the first and second inputs 48, 50 to the first and second outputs 52, 54. For example, the fourth mode may include a front-and-rear, 4WD, engine-and-motor mode, where both the engine 12 and the motor 16 drive both the front and rear wheels of the vehicle via the rear and front drivelines 14, 18 and the driveline product 20. In an embodiment including the fourth selective coupling 70, the fourth mode also may include the fourth selective coupling 70 being engaged.

Figure 5:
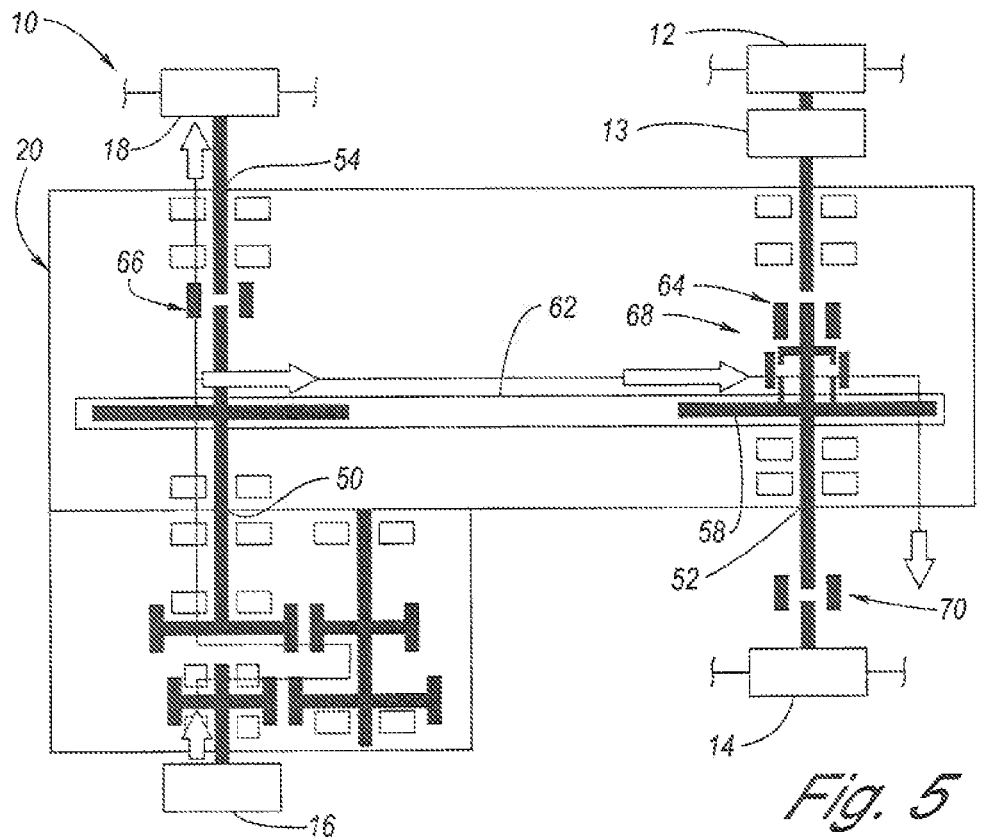
FIG. 5 illustrates a mechanical schematic of an embodiment of a portion of the vehicle powertrain of FIG. 1 according to a fifth mode of operation.

With reference to FIG. 5, a fifth mode of operation may include the first selective coupling 64 being disengaged and the second and third selective couplings 66, 68 being engaged to transmit torque from the second input 50 to the first and second outputs 52, 54. For example, the fifth mode may include a front-and-rear, 4WD, motor-only mode, where only the motor 16 drives both the front and rear wheels of the vehicle via the rear and front drivelines 14, 18 and the driveline product 20. In an embodiment including the fourth selective coupling 70, the fifth mode also may include the fourth selective coupling 70 being engaged.

Figure 6:
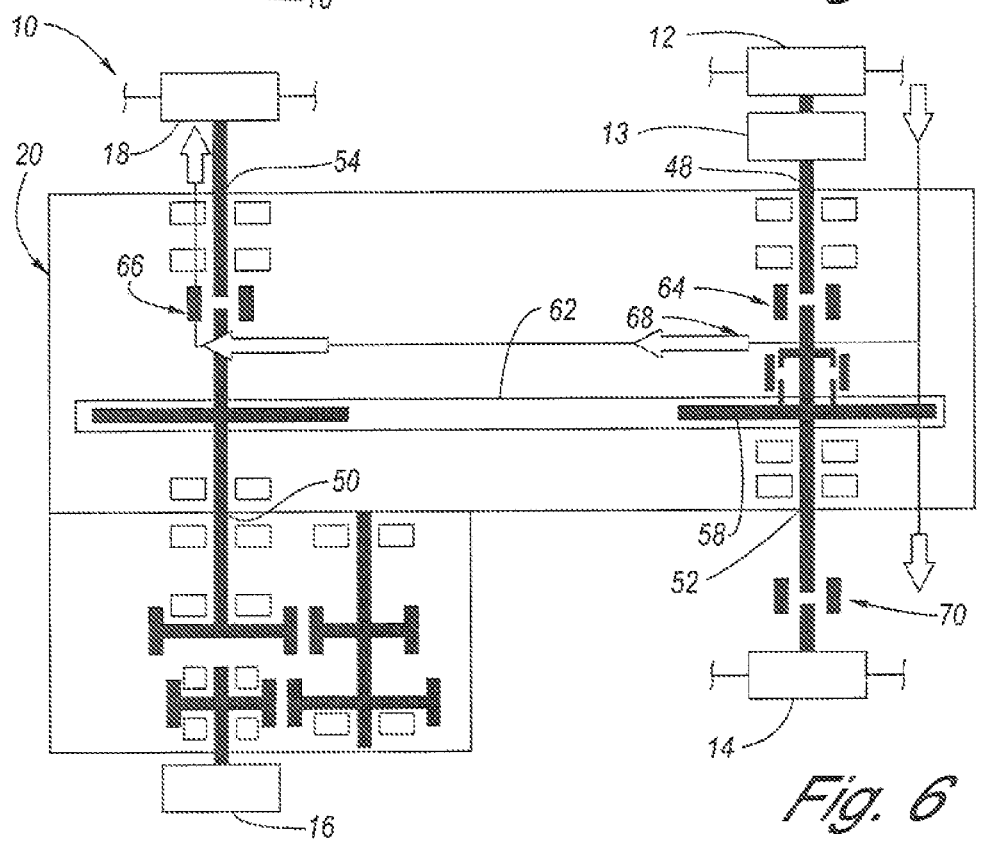
FIG. 6 illustrates a mechanical schematic of an embodiment of a portion of the vehicle powertrain of FIG. 1 according to a sixth mode of operation.

With reference to FIG. 6, a sixth mode of operation may include the first, second, and third selective couplings 64, 66, 68 being engaged to transmit torque from the first input 48 to the first and second outputs 52, 54. For example, the sixth mode may include a front-and-rear, 4WD, engine-only mode, where only the engine 12 drives both the front and rear wheels of the vehicle via the rear and front drivelines 14, 18 and the driveline product 20. In an embodiment including the fourth selective coupling 70, the sixth mode also may include the fourth selective coupling 70 being engaged.

Figure 7:
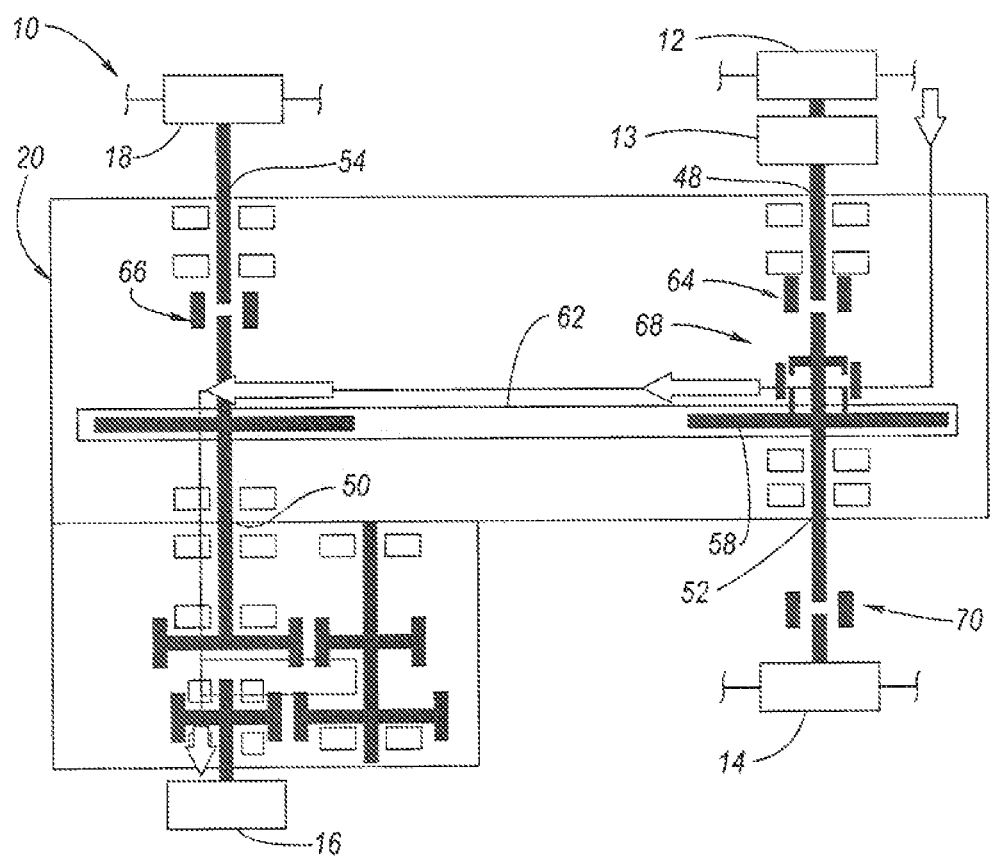
FIG. 7 illustrates a mechanical schematic of an embodiment of a portion of the vehicle powertrain of FIG. 1 according to a seventh mode of operation.

With reference to FIG. 7, a seventh mode of operation may include the second and fourth selective couplings 66, 70 being disengaged and the first and third selective couplings 64, 68 being engaged to transmit torque from the first input 48 to the second input 50. For example, the seventh mode may include a charging mode wherein the engine 12 drives the motor 16 in reverse to generate electricity for storage in one or more vehicle batteries (not shown). This mode may provide the regenerative drive in addition to the two-wheel drive and/or four-wheel drive.

The following is a description of select illustrative embodiments within the scope of the invention. The invention is not, however, limited to this description; and each embodiment and components, elements, and steps within each embodiment may be used alone or in combination with any of the other embodiments and components, elements, and steps within the other embodiments.

Embodiment 1 of the invention may include a driveline product comprising a first input to receive first prime mover torque and having a first input rotational axis, a second input to receive second prime mover torque having a second input rotational axis, a first output to transmit first driveline torque and having a first output rotational axis, a second output to transmit second driveline torque and having a second output rotational axis, a transfer coupling to couple at least one of the input rotational axes to at least one of the output rotational axes, a first selective coupling to couple the first input to the first output, and a second selective coupling to couple the second input to the second output.

Embodiment 2 of the invention may include the product as set forth in embodiment 1 for coupling to first and second prime movers and to first and second drivelines of a vehicle for operation selective between two-wheel drive or four-wheel drive operation and selective of at least one of the first prime mover or the second prime mover.

Embodiment 3 of the invention may include a product as set forth in any one of embodiments 1 or 2 wherein the first and second input rotational axes are laterally spaced apart from one another.

Embodiment 4 of the invention may include a product as set forth in any one of embodiments 1 through 3 wherein the first and second output rotational axes are laterally spaced apart from one another.

Embodiment 5 of the invention may include a product as set forth in any one of embodiments 1 through 4 wherein the transfer coupling includes a cross-axis transfer coupling to couple at least one of the input rotational axes to at least one of the output rotational axes.

Embodiment 6 of the invention may include a product as set forth in any one of embodiments 1 through 5 wherein the cross-axis transfer coupling includes a first sprocket selectively coupled to the first output and a second sprocket fixedly coupled to the second input and an endless torque transmitting element coupled to the first and second sprockets.

Embodiment 7 of the invention may include a product as set forth in any one of embodiments 1 through 6 and further comprising a third selective coupling to couple the first output to the cross-axis transfer coupling.

Embodiment 8 of the invention may include a product as set forth in any one of embodiments 1 through 7 wherein the third selective coupling is a disconnect coupling.

Embodiment 9 of the invention may include a product as set forth in any one of embodiments 1 through 8 and including at least six modes of operation:

Embodiment 10 of the invention may include a product as set forth in any one of embodiments 1 through 9 and including a mode of operation wherein the second and third selective couplings are disengaged and the first selective coupling is engaged to transmit torque from the first input to the first output.

Embodiment 11 of the invention may include a product as set forth in any one of embodiments 1 through 10 and including a mode of operation wherein the second selective coupling is disengaged and the first and third selective couplings are engaged to transmit torque from the first and second inputs to the first output.

Embodiment 12 of the invention may include a product as set forth in any one of embodiments 1 through 11 and including a mode of operation wherein the first and second selective couplings are disengaged and the third selective coupling is engaged to transmit torque from the second input to the first output.

Embodiment 13 of the invention may include a product as set forth in any one of embodiments 1 through 12 and including a mode of operation wherein the first, second, and third selective couplings are engaged to transmit torque from the first and second inputs to the first and second outputs.

Embodiment 14 of the invention may include a product as set forth in any one of embodiments 1 through 13 and including a mode of operation wherein the first selective coupling is disengaged and the second and third selective couplings are engaged to transmit torque from the second input to the first and second outputs.

Embodiment 15 of the invention may include a product as set forth in any one of embodiments 1 through 14 and including a mode of operation wherein the first, second, and third selective couplings are engaged to transmit torque from the first input to the first and second outputs.

Embodiment 16 of the invention may include a product as set forth in any one of embodiments 1 through 15 further comprising a fourth selective coupling to couple the first output to the first driveline, and a mode of operation wherein the second and fourth selective couplings are disengaged and the first and third selective couplings are engaged to transmit torque from the first input to the second input.

Embodiment 17 of the invention may include a product as set forth in any one of embodiments 1 through 16 wherein the first input receives engine torque multiplied by a transmission.

Embodiment 18 of the invention may include a product as set forth in any one of embodiments 1 through 17 wherein the second input receives motor torque multiplied by a gearset.

Embodiment 19 of the invention may include a product as set forth in any one of embodiments 1 through 18 wherein the first output transmits rear driveline torque.

Embodiment 20 of the invention may include a product as set forth in any one of embodiments 1 through 19 wherein the second output transmits front driveline torque.

Embodiment 21 of the invention may include a product as set forth in any one of embodiments 1 through 20 wherein the first selective coupling includes a first clutch.

Embodiment 22 of the invention may include a product as set forth in any one of embodiments 1 through 21 wherein the second selective coupling includes a second clutch.

Embodiment 23 of the invention may include a vehicle powertrain comprising an engine to produce engine torque and having an engine output, an electric motor to produce motor torque and having a motor output, a rear driveline having a rear driveline input, a front driveline having a front driveline input, and the driveline product as set forth in any one of embodiments 1 through 22 and coupled to the drivelines and to the engine and the electric motor for operation selective between at least two of two-wheel drive, four-wheel drive, or regenerative drive, and selective of at least one of the engine or the electric motor.

Embodiment 24 of the invention may include a powertrain as set forth in embodiment 23 further comprising a first transmission coupled to the engine to produce first transmission torque and having a first transmission input coupled to the engine output and also having a first transmission output, wherein the first input is coupled to the engine output via the first transmission and receives the engine torque as multiplied by the first transmission, and a second transmission coupled to the electric motor to produce second transmission torque and having a second transmission input coupled to the electric motor output and also having a second transmission output, wherein the second input is coupled to the electric motor via the second transmission and receives the motor torque as multiplied by the second transmission.

Embodiment 25 of the invention may include a driveline product comprising first and second inputs having input rotational axes, first and second outputs having output rotational axes, a transfer coupling to couple at least one of the input rotational axes to at least one of the output rotational axes, and at least two selective couplings to couple the inputs, and the outputs for operation selective between at least two drives powered by at least one of two prime movers.

Embodiment 26 of the invention may include the product as set forth in embodiment 25 wherein the first and second input rotational axes are laterally spaced apart from one another, the first and second output rotational axes are laterally spaced apart from one another, and the transfer coupling includes a cross-axis transfer coupling.

Embodiment 27 of the invention may include a product as set forth in any one of embodiments 25 or 26 wherein the at least two selective couplings include a first selective coupling to couple the first input to the first output, a second selective coupling to couple the second input to the second output, and a third selective coupling to couple the first output to the cross-axis transfer coupling, and wherein the cross-axis transfer coupling is fixedly coupled to the second input and is selectively coupled to the first output.

Embodiment 28 of the invention may include a product as set forth in any one of embodiments 25 through 27 with at least six modes of operation including a first mode of operation wherein the second and third selective couplings are disengaged and the first selective coupling is engaged to transmit torque from the first input to the first output, a second mode of operation wherein the second selective coupling is disengaged and the first and third selective couplings are engaged to transmit torque from the first and second inputs to the first output, a third mode of operation wherein the first and second selective couplings are disengaged and the third selective coupling is engaged to transmit torque from the second input to the first output, a fourth mode of operation wherein the first, second, and third selective couplings are engaged to transmit torque from the first and second inputs to the first and second outputs, a fifth mode of operation wherein the first, selective coupling is disengaged and the second and third selective couplings are engaged to transmit torque from the second input to the first and second outputs, and a sixth mode of operation wherein the first, second, and third selective couplings are engaged to transmit torque from the first input to the first and second outputs.

Embodiment 29 of the invention may include a product as set forth in any one of embodiments 25 through 28 further comprising a fourth selective coupling to couple the first output to the first driveline, and a seventh mode of operation wherein the second and fourth selective couplings are disengaged and the first and third selective couplings are engaged to transmit torque from the first input to the second input.

Embodiment 30 of the invention may include a product as set forth in any one of embodiments 25 through 29 wherein the at least two drives include at least two of a two-wheel drive, a four-wheel drive, or a regenerative drive.

Embodiment 31 of the invention may include a product as set forth in any one of embodiments 25 through 30 wherein the at least two selective couplings are engaged to transmit torque from the first input to the second input in the regenerative drive.

The above description of select examples of embodiments of the invention is merely exemplary in nature and, thus, variations or variants thereof are not to be regarded as a departure from the spirit and scope of the invention.

What is claimed is:

1. A driveline product comprising:
    a first input to receive first prime mover torque and having a first input rotational axis;
    a second input to receive second prime mover torque having a second input rotational axis, wherein the first and second input rotational axes are laterally spaced apart from one another;
    a first output to transmit first driveline torque and having a first output rotational axis;
    a second output to transmit second driveline torque and having a second output rotational axis, wherein the first and second output rotational axes are laterally spaced apart from one another;
    a transfer coupling to couple at least one of the input rotational axes to at least one of the output rotational axes, wherein the transfer coupling includes a cross-axis transfer coupling to couple at least one of the input rotational axes to at least one of the output rotational axes, wherein the cross-axis transfer coupling includes a first sprocket selectively coupled to the first output and a second sprocket fixedly coupled to the second input and an endless torque transmitting element coupled to the first and second sprockets;
    a first selective coupling to couple the first input to the first output; and
    a second selective coupling to couple the second input to the second output.

2. The driveline product as set forth in claim 1 for coupling to first and second prime movers and to first and second drivelines of a vehicle for operation selective between two-wheel drive or four-wheel drive operation and selective of at least one of the first prime mover or the second prime mover.

3. The driveline product as set forth in claim 1 further comprising a third selective coupling to couple the first output to the cross-axis transfer coupling.

4. The driveline product as set forth in claim 3 wherein the third selective coupling is a disconnect coupling.

5. The driveline product as set forth in claim 3 and including at least six modes of operation.

6. The driveline product as set forth in claim 5 including a mode of operation wherein the second and third selective couplings are disengaged and the first selective coupling is engaged to transmit torque from the first input to the first output.

7. The driveline product as set forth in claim 5 including a mode of operation wherein the second selective coupling is disengaged and the first and third selective couplings are engaged to transmit torque from the first and second inputs to the first output.

8. The driveline product as set forth in claim 5 including a mode of operation wherein the first and second selective couplings are disengaged and the third selective coupling is engaged to transmit torque from the second input to the first output.

9. The driveline product as set forth in claim 5 including a mode of operation wherein the first, second, and third selective couplings are engaged to transmit torque from the first and second inputs to the first and second outputs.

10. The driveline product as set forth in claim 5 including a mode of operation wherein the first selective coupling is disengaged and the second and third selective couplings are engaged to transmit torque from the second input to the first and second outputs.

11. The driveline product as set forth in claim 5 including a mode of operation wherein the first, second, and third selective couplings are engaged to transmit torque from the first input to the first and second outputs.

12. The driveline product as set forth in claim 5 further comprising a fourth selective coupling to couple the first output to the first driveline, and a mode of operation wherein the second and fourth selective couplings are disengaged and the first and third selective couplings are engaged to transmit torque from the first input to the second input.

13. The driveline product as set forth in claim 1 wherein the first input receives engine torque multiplied by a transmission.

14. The driveline product as set forth in claim 1 wherein the second input receives motor torque multiplied by a gearset.

15. The driveline product as set forth in claim 1 wherein the first output transmits rear driveline torque.

16. The driveline product as set forth in claim 1 wherein the second output transmits front driveline torque.

17. The driveline product as set forth in claim 1 wherein the first selective coupling includes a first clutch.

18. The driveline product as set forth in claim 1 wherein the second selective coupling includes a second clutch.

19. A vehicle powertrain comprising:
    an engine to produce engine torque and having an engine output;

an electric motor to produce motor torque and having a motor output;
a rear driveline having a rear driveline input;
a front driveline having a front driveline input; and
the driveline product as set forth in claim 1 and coupled to the drivelines and to the engine and the electric motor for operation selective between at least two of two-wheel drive, four-wheel drive, or regenerative drive, and selective of at least one of the engine or the electric motor.

20. The vehicle powertrain as set forth in claim 19 further comprising:
a first transmission coupled to the engine to produce first transmission torque and having a first transmission input coupled to the engine output and also having a first transmission output, wherein the first input is coupled to the engine output via the first transmission and receives the engine torque as multiplied by the first transmission; and
a second transmission coupled to the electric motor to produce second transmission torque and having a second transmission input coupled to the electric motor output and also having a second transmission output, wherein the second input is coupled to the electric motor via the second transmission and receives the motor torque as multiplied by the second transmission.

21. A driveline product comprising:
first and second inputs having input rotational axes;
first and second outputs having output rotational axes;
a transfer coupling to couple at least one of the input rotational axes to at least one of the output rotational axes;
at least two selective couplings to couple the inputs and the outputs for operation selective between at least two drives powered by at least one of two prime movers;
wherein the first and second input rotational axes are laterally spaced apart from one another, the first and second output rotational axes are laterally spaced apart from one another, and the transfer coupling includes a cross-axis transfer coupling; and
wherein the at least two selective couplings include a first selective coupling to couple the first input to the first output, a second selective coupling to couple the second input to the second output, and a third selective coupling to couple the first output to the cross-axis transfer coupling, and wherein the cross-axis transfer coupling is fixedly coupled to the second input and is selectively coupled to the first output.

22. The driveline product as set forth in claim 21, with at least six modes of operation including:
a first mode of operation wherein the second and third selective couplings are disengaged and the first selective coupling is engaged to transmit torque from the first input to the first output;
a second mode of operation wherein the second selective coupling is disengaged and the first and third selective couplings are engaged to transmit torque from the first and second inputs to the first output;
a third mode of operation wherein the first and second selective couplings are disengaged and the third selective coupling is engaged to transmit torque from the second input to the first output;
a fourth mode of operation wherein the first, second, and third selective couplings are engaged to transmit torque from the first and second inputs to the first and second outputs;
a fifth mode of operation wherein the first selective coupling is disengaged and the second and third selective couplings are engaged to transmit torque from the second input to the first and second outputs; and
a sixth mode of operation wherein the first, second, and third selective couplings are engaged to transmit torque from the first input to the first and second outputs.

23. The driveline product as set forth in claim 22 further comprising a fourth selective coupling to couple the first output to the first driveline, and a seventh mode of operation wherein the second and fourth selective couplings are disengaged and the first and third selective couplings are engaged to transmit torque from the first input to the second input.

24. The driveline product as set forth in claim 21, wherein the at least two drives include at least two of a two-wheel drive, a four-wheel drive, or a regenerative drive.

25. The driveline product as set forth in claim 24 wherein the at least two selective couplings are engaged to transmit torque from the first input to the second input in the regenerative drive.

26. A driveline product comprising:
a first input to receive first prime mover torque and having a first input rotational axis;
a second input to receive second prime mover torque having a second input rotational axis, wherein the first and second input rotational axes are laterally spaced apart from one another;
a first output to transmit first driveline torque and having a first output rotational axis;
a second output to transmit second driveline torque and having a second output rotational axis, wherein the first and second output rotational axes are laterally spaced apart from one another;
a transfer coupling to couple at least one of the input rotational axes to at least one of the output rotational axes, wherein the transfer coupling includes a cross-axis transfer coupling to couple at least one of the input rotational axes to at least one of the output rotational axes, wherein the cross-axis transfer coupling includes a first gear selectively coupled to the first output and a second gear fixedly coupled to the second input and an endless torque transmitting element coupled to the first and second gear;
a first selective coupling to couple the first input to the first output; and
a second selective coupling to couple the second input to the second output.

27. The driveline product as set forth in claim 26 further comprising a third selective coupling to couple the first output to the cross-axis transfer coupling.

\* \* \* \* \*